Figure 1:
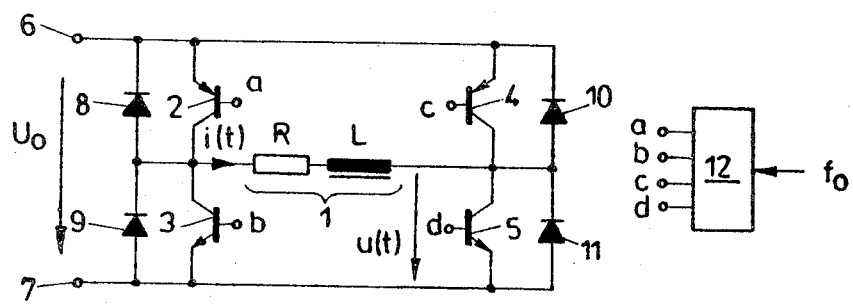

United States Patent [19]

Brasseur

[11] 4,434,392
[45] Feb. 28, 1984

[54] CIRCUIT ARRANGEMENT FOR CONTROLLING THE COMMUTATION IN A STEPPING MOTOR

[75] Inventor: Georg Brasseur, Vienna, Austria

[73] Assignee: Friedmann & Maier Aktiengesellschaft, Austria

[21] Appl. No.: 281,116

[22] Filed: Jul. 7, 1981

[30] Foreign Application Priority Data

Jul. 10, 1980 [AT] Austria .............................. A 3611/80

[51] Int. Cl.³ ............................................. G05B 19/40
[52] U.S. Cl. .................................. 318/696; 318/138; 318/254; 318/685
[58] Field of Search ................ 318/138, 254, 685, 696

[56] References Cited

U.S. PATENT DOCUMENTS

| | | | |
|---|---|---|---|
| 4,121,144 | 10/1978 | Leenouts | 318/696 |
| 4,347,464 | 8/1982 | Park et al. | 318/254 |
| 4,348,619 | 9/1982 | Ray et al. | 318/254 X |

*Primary Examiner*—Stanley J. Witkowski
*Attorney, Agent, or Firm*—Cushman, Darby & Cushman

[57] ABSTRACT

In a circuit arrangement for controlling the commutation of a stepping motor, each phase winding (1) of which is connected to the detector diagonal of a bridge circuit consisting of four switching transistors (2, 3, 4, 5), a capacitor (17) is connected across each phase winding (1) and a decoupling diode (13, 14) is included in each of two arms of the bridge circuit. In case of a bridge circuit comprising complementary transistors (2, 4; 3, 5), whose emitters are connected to the terminals (6, 7) of the supply voltage ($U_o$) and whose collectors are interconnected in pairs, the decoupling diodes (13, 14) are included in the collector leads of the transistors (2, 4) of one type of conductivity, and protective diodes (15, 16) are connected in parallel to the collector-emitter path of the transistors (3, 5) of the other type of conductivity.

7 Claims, 4 Drawing Figures

CIRCUIT ARRANGEMENT FOR CONTROLLING THE COMMUTATION IN A STEPPING MOTOR

This invention relates to a circuit arrangement for controlling the commutation in a stepping motor in which the or each phase winding is connected to the detector diagonal of a bridge circuit consisting of four switching transistors.

Stepping motors are increasingly used as final control elements in control systems and numerically controlled machine-tools and the like and in such uses afford the advantage that when controlled by digital electronic circuitry they will ensure an exact, reproducible setting or positioning without need for feedback. The use of stepping motors is limited by the torque that is available and by the shortest possible stepping period. The time constant of commercially available stepping motors is of an order of milliseconds. Particularly when the maximum output torque of a stepping motor is not required, the stepping frequency of the stepping motor can be increased without an increase of the thermal load if resistors are connected in series with the motor windings and the supply voltage is increased correspondingly. As this will lower the overall efficiency, a compromise between the desires for a high stepping frequency, a high utilization of the motor and a low power input is generally required. The measure set forth hereinbefore will shorten the time constant L/R, where L is the self-induction of the motor winding and R is the total resistance in series therewith, i.e., the total resistance of the winding and of any external resistor connected thereto. That concept can be extended in that the windings of the stepping motor are suitably supplied from electric power sources which deliver a load-independent current. The reduction of that concept to practice is opposed by the fact that the switching operations give rise to very high reverse voltages, which are due to self-induction, at the windings so that a current having a predetermined direction and current value cannot be maintained unless the power transistors connected as current sources are fed by a source of a high d.c. voltage so that the overall efficiency will be further reduced and it will be difficult to dissipate heat from the power transistors. Besides, a d.c. voltage which is sufficiently high for such mode of operation is not always available, e.g. if the power is supplied to the stepping motor from the electric system of a motor vehicle at 12 or 24 volts.

It is an object of the invention to provide a circuit arrangement which permits a faster commutation at the windings of stepping motors without need for a higher supply voltage and without a decrease in power efficiency. In a circuit arrangement of the kind described first hereinbefore, this object is accomplished according to the invention in that a capacitor is connected to the ends of each phase winding of the stepping motor so as to form a resonant circuit and a decoupling diode is included in each of two arms of the transistorized bridge circuit. The dissipative inductance of the motor winding is supplemented by the capacitor to form a resonant circuit. When a current flowing through the winding is interrupted so that the field collapses, the energy stored in the magnetic field will cause a current to flow in the resonant circuit so that the frequency of oscillation and the time required for the commutation at the motor winding will depend on the selected capacitance of the capacitor and the inductance of the winding. Owing to the decoupling diodes, the voltage can swing freely without a reversal of polarity at the collector-emitter path of one of the power transistors. Owing to this mode of operation, a quick commutation at the motor winding can be effected even when only a low supply voltage is available and cannot be increased with simple means and the motor can thus be operated at a high stepping frequency, if required.

The arrangement is suitably such that each transistorized bridge circuit for switching a phase winding and a parallel capacitor associated therewith consists of complementary transistors having emitters which are connected to the terminals of the supply voltage source and collectors which are interconnected in pairs, protective diodes are connected to two of the transistors, preferably to the n-p-n transistors, and one of the decoupling diodes is included in the collector lead of each of the two other transistors, preferably of the p-n-p transistors. If constant potentials are applied to the emitters of all transistors of the transistorized bridge circuit, the associated driver circuit can control the power transistors with low voltage amplitudes. During a swing of the voltage applied to the resonant circuit consisting of the winding and the capacitor connected in parallel thereto, the protective diodes connected in parallel to two of the power transistors prevent a reversal of the voltage applied to the collector-emitter paths of said transistors. The decoupling diodes included in the collector leads of the two other transistors protect said transistors from a breakdown caused by excessive overvoltages. As p-n-p silicon transistors generally have a lower maximum voltage than the complementary n-p-n types, the decoupling diodes are suitably included in the collector leads of the p-n-p transistors.

The overload protection of the power transistors of the bridge circuit can be further improved in that each phase winding and the associated parallel capacitor are switched by a transistorized bridge circuit which is fed by a source of a load-independent current or by a current-limited voltage source. In that case even capacitors having a high capacitance may be connected in parallel to the motor windings if this is required so that there will be no need for a protective series resistor and the reliability in operation of the circuit arrangement will be ensured even if the pulses controlling the several power transistors succeed each other without an interval or even overlap each other in time. In the latter case, all four power transistors of the bridge circuit will be conducting for a short time during each commutation.

Figure 2:
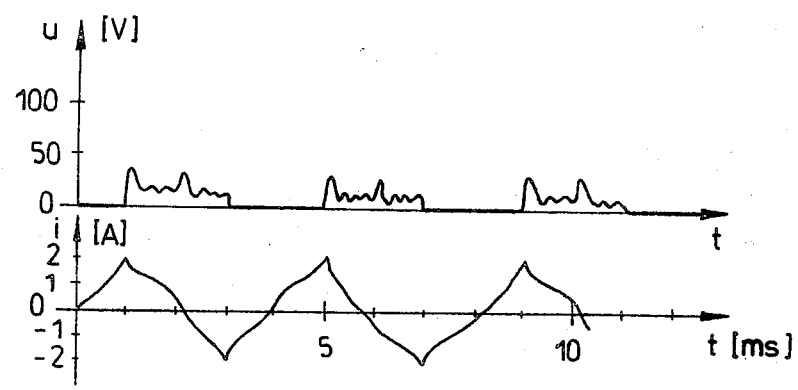
Figure 3:
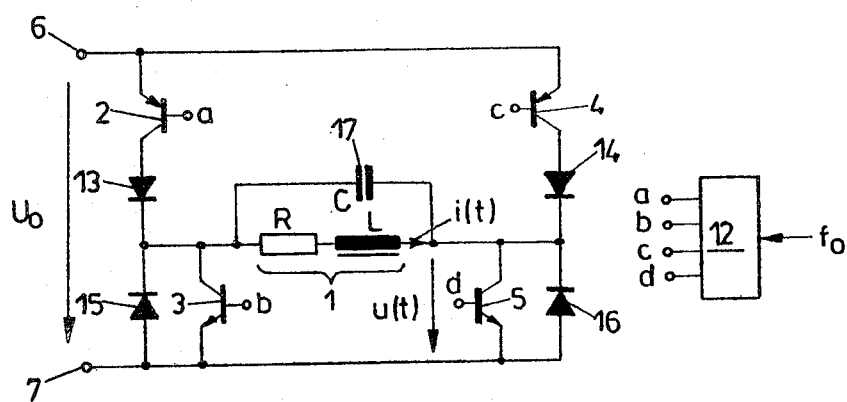
Figure 4:
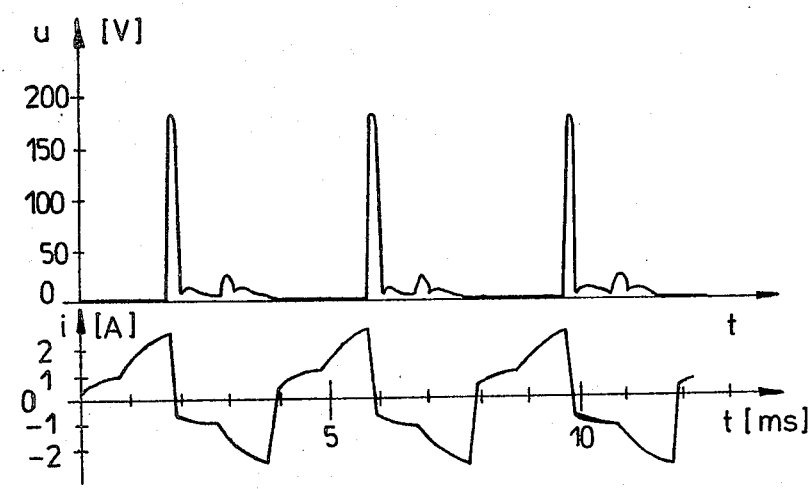

The invention will now be explained more fully with reference to an illustrative embodiment shown an the drawing, in which FIG. 1 is a known circuit arrangement for feeding a winding of a stepping motor, FIG. 2 is a graph illustrating how the current flowing through the winding and the voltage applied to the winding change with time, FIG. 3 shows a circuit arrangement according to the invention for feeding a winding of a stepping motor and FIG. 4 is an associated graph showing how the current flowing through the winding and the voltage applied to the winding having a parallel capacitor associated with it changes with time.

FIG. 1 shows a circuit arrangement of the prior art. Only the means for controlling one phase of a two-phase stepping motor are shown. The winding 1 of the stepping motor has an inductance L and a resistance R. The winding 1 is controlled by a bridge circuit consisting of four power transistors 2, 3, 4 and 5. The transistors 2 and 4 are p-n-p transistors having emitters connected to the positive terminal 6 of a voltage source. The transistors 3 and 5 are n-p-n transistors having emitters connected to the negative terminal 7 of the voltage source. The collectors of each of the complementary pairs of transistors 2, 3 and 4, 5 are interconnected. The winding 1 of the stepping motor is connected in the detector diagonal between the two collector leads. A protective diode 8, 9, 10 or 11 is connected in parallel to each of the transistors 2, 3, 4 and 5. These diodes are reversely biased in a state of rest by the supply voltage applied to terminals 6 and 7 and serve to protect the associated transistor against voltages which are generated by self-induction when the current flowing in the winding 1 is interrupted or reversed. Such voltages caused by self-induction might have an amplitude in excess of the maximum voltage of the transistors and might involve a reversal of the voltage applied to the transistors so that the collector-base junction of the transistor could be rendered conducting. The power transistors are controlled by logic circuitry 12, to which an input signal at a frequency $f_o$ is supplied and which has output terminals a, b, c and d for delivering driver signals to the correspondingly designated base terminals of the power transistors.

FIG. 2 is a graph showing in its upper half how the voltage applied to one end of the motor winding, the right-hand end in FIG. 1, at the junction between the collectors of transistors 4 and 5 and between the diodes 10 and 11, changes with time, and showing in its lower half how the current flowing through the winding 1 changes with time. The selected stepping frequency of 1000 Hz is close to the maximum frequency at which the motor can be operated in this circuit arrangement. The maximum value of the supply voltage $U_o$ applied to terminals 6 and 7 is 18 volts and the value $I_{rms}$ of the current is 0.8 ampere. The change of the current flowing through the winding 1 with time owing to the reversal of the voltage applied, which reversal is effected by the power transistors of the bridge circuit, can be approximately defined by the following formula:

$$i(t) = \frac{U_o - U_{reverse}\left(1 - e^{-\frac{R}{L}t}\right)}{R}$$

By two of the parallel diodes associated with the power transistors, the reverse voltage which is due to the commutation is short-circuited with respect to the voltage source connected to terminals 6 and 7 so that the commutation in the winding is driven by a relatively low voltage. As a result, the entire energy previously stored in the magnetic field is removed from the winding and must now be supplied once more by the source. Particularly when the supply voltage has a fixed, predetermined value and cannot be increased, the almost triangular shape of the current flowing in the winding will impose an upper limit regarding the stepping frequency.

The problem is solved in accordance with the invention in that a capacitor is connected in parallel to the motor winding, which constitutes a dissipating inductance, so that a resonant circuit is formed, and the bridge circuit is modified. A corresponding circuit arrangement is shown in FIG. 3, which again illustrates the means for supplying one phase of the two-phase stepping motor shown also in FIG. 1. The winding 1 and the power transistors 2, 3, 4, 5 and their driver circuit 12 have the same functions as in the known circuit arrangement. A difference resides in the provision of a decoupling diode 13 or 14 in the collector lead of each p-n-p transistor 2 or 4. The protective diodes 15 and 16 are similar in function to the diodes 9 and 11 of the circuit arrangement of FIG. 1. An essential feature of the circuit arrangement according to the invention is the provision of a capacitor 17 connected in parallel to the winding 1.

For this circuit arrangement the graph shown in FIG. 4 represents in the upper half the change of the voltage applied to the right-hand end of the winding 1 in FIG. 3 with time and in the lower half the change of the current flowing through the winding 1 with time. The upper limit for the supply voltage $U_o$ applied to terminals 6 and 7 is again 18 volts. But owing to the arrangement according to the invention the current flowing through the winding 1 of the same stepping motor may have an rms value $I_{rms}$ of 2.15 amperes if the same supply voltage is applied and the same stepping frequency $f_o$ of 1000 Hz is used so that a higher torque or a higher maximum stepping frequency can be obtained with a given supply voltage.

In the improved circuit arrangement according to the invention, the oscillation of the energy stored in the magnetic field of the winding 1 will be reversed by the capacitor 17 when the previously conducting transistors 2 and 5 have been blocked. The capacitor 17 will then determine the frequency of oscillation $\omega_o$ and the maximum voltage $u_L$ applied to the load, in accordance with the following approximate formulas:

$$u_L \leq \sqrt{\frac{L}{C}} \times \hat{i}(t)$$

Angular frequency $\omega_o = 1\sqrt{LC}$

During the reversal of the oscillation, the blocked transistor 5 and the diode 14 will decouple the resonant circuit 1, 17 from the bridge and the transistors 3 and 4 may be rendered conducting. After the oscillation has been reversed, the transistors 3 and 4 will supply current to the winding 1 and the source must only make up the losses caused by the reversal of the oscillation. The advantage afforded by the circuit arrangement according to the invention will be particularly conspicuous if the supply voltage is low because the reversal of the oscillation may result in a voltage rise so that a voltage of several hundred volts may appear at the terminals of the winding 1 and the process will thus be considerably accelerated. That high voltage is applied as a reverse voltage to the diode 14 and the transistor 5 or to the diode 13 and the transistor 3 and can be handled by components which are readily available.

What is claimed is:

1. A circuit arrangement for controlling commutation of a stepping motor comprising:
    a four arm bridge circuit defining a bridge diagonal and having first, second, third and fourth switching transistors, one trasistor being in circuit in each arm, said first and second transistors being in adjacent arms on one side of said diagonal and said third and fourth transistors being in adjacent arms on the other side of said diagonal, said transistors being adapted to be switched by signals from a logic circuit for controlling the commutation of said stepping motor;

means for coupling a winding of said stepping motor across said bridge diagonal;

a capacitor coupled across said bridge diagonal so as to be in parallel circuit with said stepping motor winding and from a resonant circuit with an effective inductance of said winding; and a decoupling diode in series with each of said first and third transistors.

2. A circuit arrangement according to claim 1 wherein said first and second transistors comprise a complementary pair of transistors including a PNP transistor and an NPN transistor, and wherein said third and fourth transistors comprise a complementary pair of transistors including a PNP transistor and an NPN transistor, respective emitters of each complementary pair being adapted to be coupled to opposite poles of a power supply for supplying power to said winding via said four transistors.

3. A circuit according to claim 2 wherein said PNP transistors are said first and third transistors and the decoupling diodes associated therewith couple the collectors of said first and third transistors to the collectors of said second and fourth transistors, respectively.

4. A circuit according to claim 3 further comprising a protective diode coupled in parallel with each of said second and fourth transistors.

5. A circuit according to claim 1 further comprising a power supply having a first pole coupled to said first and third transistors and a second pole coupled to said second and fourth transistors.

6. A circuit according to claim 5 wherein said power supply is a load-independent current source.

7. A circuit according to claim 5 wherein said power supply is a current-limited voltage source.

* * * * *